Figure 1:
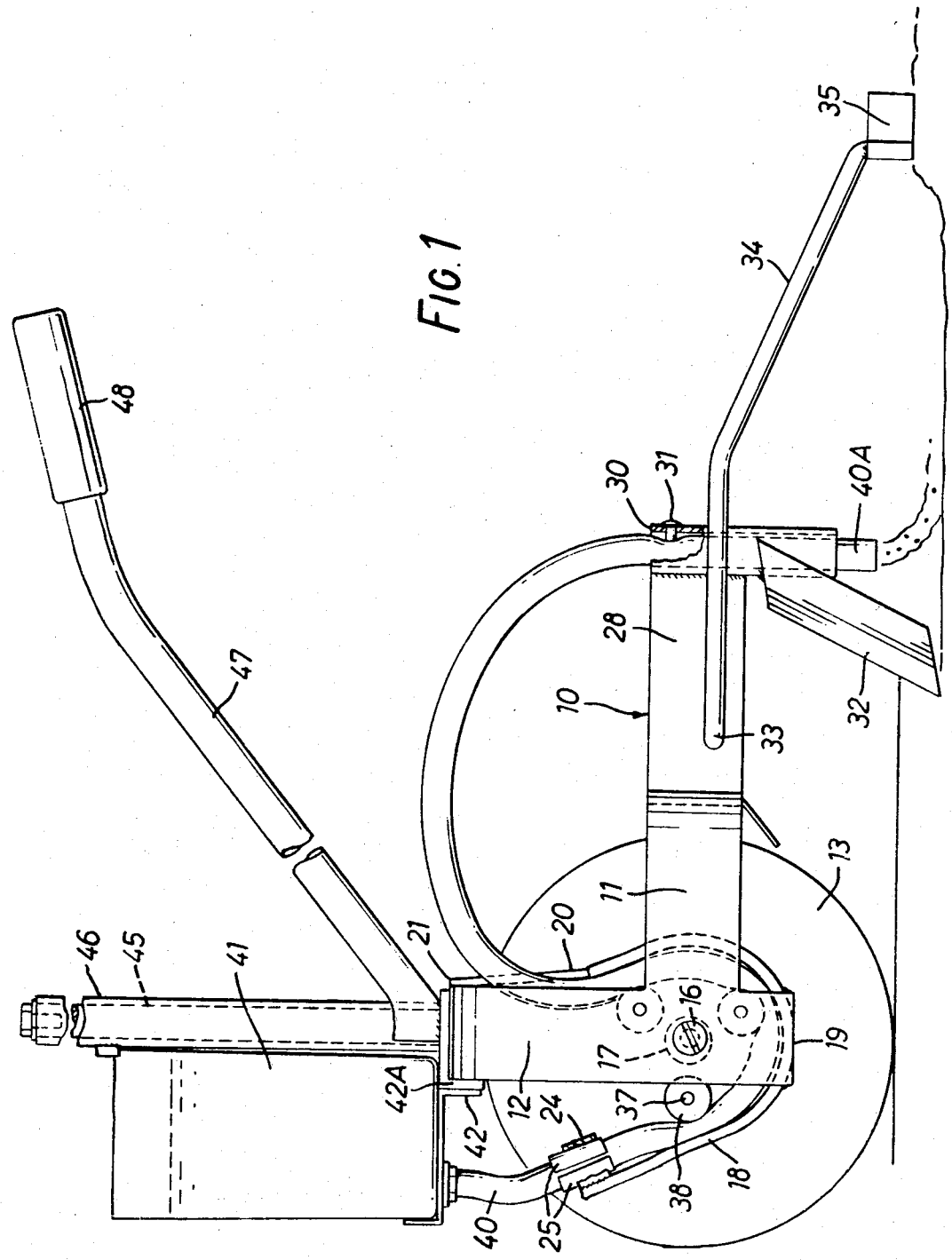

United States Patent [19]
Cruse

[11] 4,224,882
[45] Sep. 30, 1980

[54] APPARATUS FOR SOWING SEEDS IN SUSPENSION

[76] Inventor: John W. Cruse, Robertsbridge, England

[21] Appl. No.: 879,558

[22] Filed: Feb. 21, 1978

[51] Int. Cl.³ .............................................. A01C 7/20
[52] U.S. Cl. ......................................... 111/7; 111/78; 111/DIG. 1; 222/614; 417/477
[58] Field of Search ........................ 111/1, 6, 7, 8–13, 111/72, 78, 82; 222/214, 614; 417/477; 401/197

[56] References Cited

U.S. PATENT DOCUMENTS

| 2,703,256 | 3/1955 | Mascaro | 417/477 X |
| 3,230,570 | 1/1966 | Flippen | 401/197 X |
| 3,384,080 | 5/1968 | Muller | 222/214 X |
| 3,442,221 | 5/1969 | Phillips et al. | 111/7 X |
| 3,744,441 | 7/1973 | Smith et al. | 111/7 X |

FOREIGN PATENT DOCUMENTS

| 448388 | 5/1948 | Canada | 111/7 |
| 1045732 | 10/1966 | United Kingdom | 111/6 |
| 1296928 | 11/1972 | United Kingdom | 111/7 |
| 288823 | 4/1971 | U.S.S.R. | 111/7 |

Primary Examiner—Edgar S. Burr
Assistant Examiner—Steven A. Bratlie
Attorney, Agent, or Firm—James Creighton Wray

[57] ABSTRACT

The invention provides an apparatus for sowing seeds in a liquid suspension in which a peristaltic pump supplies the suspension to the ground at a position behind and above the lower part of a drill coulter.

2 Claims, 2 Drawing Figures

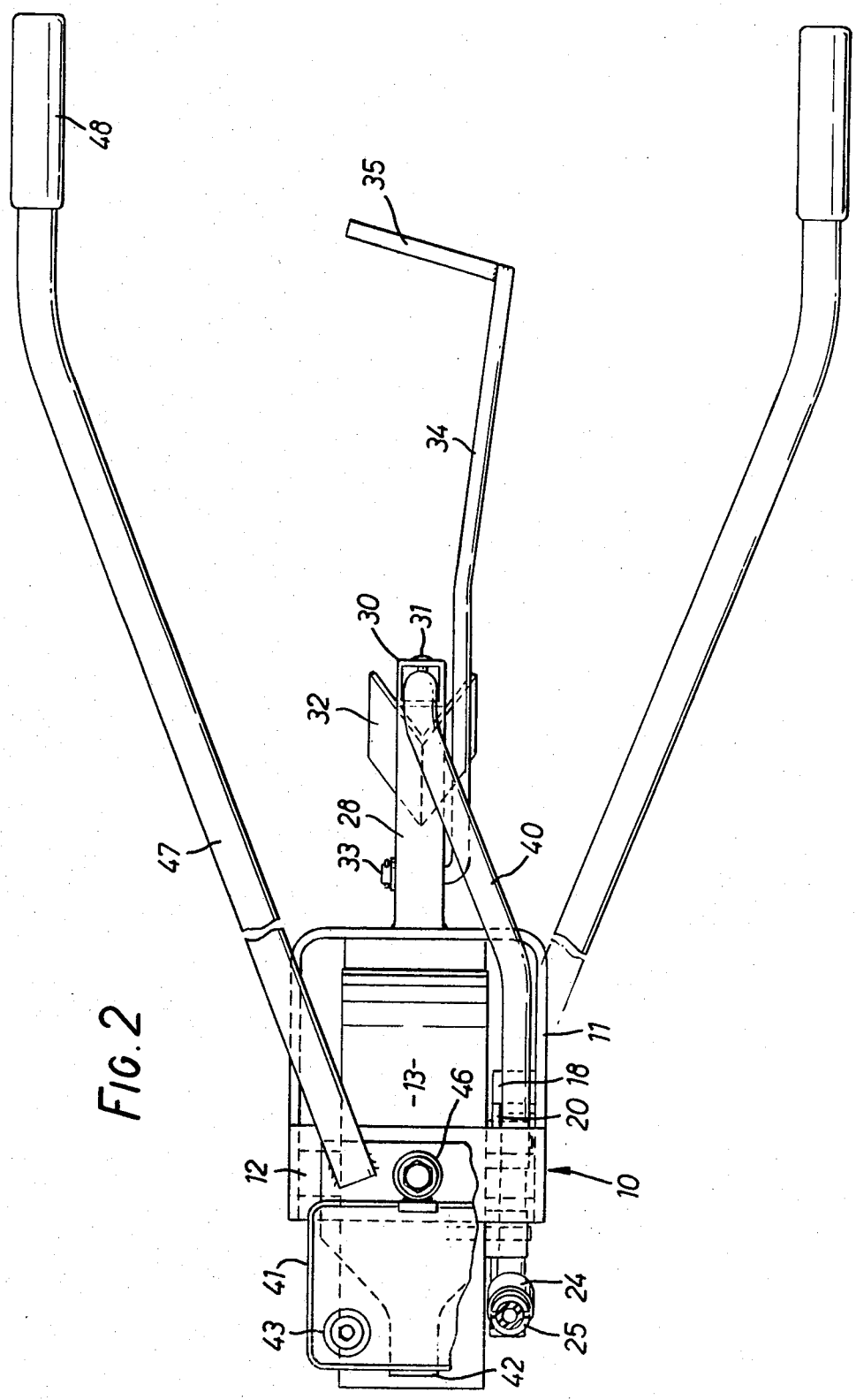

APPARATUS FOR SOWING SEEDS IN SUSPENSION

This invention relates to apparatus for sowing seeds.

Sowing of seeds in rows or drills is commonly carried out by sowing dry ungerminated seeds in rows by seed drill apparatus. For example a well known apparatus uses perforated belts for the seeds to fall through the holes in the belts. This requires a different belt for each kind of seed—even very similar seeds requiring different belts. Also different speeds of travel of the apparatus are required for different seeds.

Attempts have been made to sow seeds in liquid suspension e.g. alginate gel or wallpaper paste by pumping the suspension by a sludge pump. This however has not been sufficiently successful since some of the seeds are damaged by the pump valves, the seeds are not regularly spaced along the rows and the number of seeds per foot cannot be provided with sufficient accuracy.

It has been proposed in prior patent specification No. 1045732 to feed the seeds suspension by a peristaltic pump to a hollow coulter having an outlet in its underneath surface. However, no such machine has heretofore proved to be practical.

The suspension is thus injected into the ground and alternative means are described all for injecting the suspension into the ground.

I have now made an apparatus which has proved to be practical and efficient and based largely on my discovery that the suspension should not be injected into the ground but should be dropped on to the ground from a position above the ground.

According to the invention an apparatus for sowing seeds comprises at least one ground engaging wheel, a tank to contain seeds in suspension, a drill coulter, peristaltic pump means including a pipe having one end connected to said tank, means for supporting the other end of the pipe with its open end behind the coulter and above the lower part of the coulter.

The pipe may be a rubber pipe but it may be connected to the intake and/or outlet by a transparent plastics pipe through which the operator can see that the suspension is flowing.

The rotor axle is geared with a known ratio (e.g. 1:1) with an axle which carries ground engaging wheels or the rotor may be carried by a ground engaging wheel co-axially therewith or the rotors of a number of pumps may be mounted on a common axle geared to the ground wheels.

I have found that with a half inch diameter bore pipe various kinds and sizes of seeds can be sown e.g. lettuce, carrots, swedes, turnips and brassicas. Parsnip and beet seeds require a larger diameter tube e.g. 0.75 inch. Maize and beans require a still larger size tube.

The number of seeds per foot can be judged by counting the seeds in a measure e.g. a dessertspoon and a fairly regular number of seeds per foot can be achieved. A greater or less number can be obtained by changing the ratio of seeds to liquid.

The seeds can be spaced apart sufficiently to ensure that thinning out becomes unnecessary.

A constructional form of apparatus made in accordance with the invention will be described by way of example with reference to the accompanying diagrammatic drawings, wherein:

The apparatus as shown in FIGS. 1 and 2 consists of a frame 10 which has two U-shaped bridges 11, 12 at right angles to each other, one (11) being horizontal and the other (12) being vertical and both extending over a hollow ground engaging wheel 13. The wheel is rotatably mounted in bearings 16 on the lower ends of the bridge 12. The bearings may include eccentric adjusting rings 17.

An approximately U-shaped brcket 18 located on one side of the wheel 13 and is welded at 19 to the bottom of one leg of the bridge 12 and has an arm 20 at its rear end welded at 21 to the top of the bridge 12. The bracket 18 carries at its front end a ring shaped holder 24 to receive a two-part tapered collet 25.

The frame has a rear extension in the form of an arm 28 which may be of rectangular hollow section. Welded to the rear end of the arm 28 is a vertical tube 30, the upper end of which has a rivet 31 which projects a short distance into the interior of the tube.

Welded at its upper end to the tube 30 is a coulter 32 of V- cross-section and lower pointed end in front of the tube 30.

If desired a ground firming roller may be attached to follow the bar 35 or the coulter 32, pipe 30, and bar 35 may be mounted in front of the wheel 13 so that the wheel 13 serves as the ground firming wheel.

Pivoted at 33 to the arm 28 is a rod 34 which carries a horizontal draw bar 35 at its rear end behind the tube 30.

Three axles 37 are fixed in the wheel 13 and project on the same side as the bracket 18 to carry freely rotatable rollers 38.

An elastic pipe 40 is held near its forward end in the collet 25 and is disposed on the bracket 18 between the bracket and the rollers 38 so as to be squeezed by the rollers alternately as the wheel 13 rotates. The pipe 40 and rollers 38 thus form a peristaltic pump. By adjusting the eccentric rings 17 the extent to which the rollers compress the elastic pipe 40 can be adjusted. The upper forward end of the pipe is attached to the bottom of a seed suspension container 41 and the rear end is engaged in the tube 30 so that its open discharge end 40*a* is above the lower end of the coulter 32 and thus always above the level of the earth in the drill formed by the coulter. As shown in the drawings the discharge opening of the pipe is located above the normal level of the ground so that the suspension has a free fall into the drill. The container 41 has a filling hole at 43 and is mounted on brackets 42, 42*a* that is fixed to the bridge 12.

The bridge 12 carries an upwardly extending bar 45 on which is placed a tube 46 mounted on the bracket 42. The bracket 42 carries two arms 47 the rear ends of which form handles 48.

By means of this apparatus the seed is correctly metered at a predetermined average spacing in direct or known relation to the speed at which the apparatus is travelling.

The rubber pipe 41 may have half an inch diameter bore with walls three sixteenths inch thick and may be made of fairly soft rubber which can be compressed between finger and thumb. This tube can pass seeds up to three sixteenths inch diameter.

Cleaning is simply effected by passing water through the pipes 40.

The peristaltic pump does not damage seeds even pregerminated (chitted) seeds.

Pesticides, herbicides, fertiliser grains or other desired channels may be added to the suspension.

If desired in order to reduce pulsation, the peristaltic pump output may be connected to a sealed container large enough for this purpose and having the pipe 40 connected to it. The container may contain a body of air above the liquid level in the container to assist in reducing or eliminating pulsation.

A number e.g. 10 to 15 of such apparatus (without the tube 46 and bar 47) may be mounted on a three-point suspension type of tractor. For this purpose a long transverse bracket is fitted to the tractor. The bracket may be made by two bars parallel to each other a short distance apart and connected together by short tubular cross-bars preferably of square section. A dozen or more of the seed sowing devices may have the bars 45 mounted in the cross-bars on springs and spaced between the wheels of the tractor and extending at each side of the side of the tractor wheels. The bracket is connected to the two power operated suspension bars of the tractor system.

The bracket may carry a tank for the seed suspension and this tank may be connected to all the pipes 40 of the seed sowing devices. The third tractor support arm may be connected to the tank. The height of the seed sowing attachment can be adjusted by extending or contracting the upper link of the tractor suspension system. The tank may be fitted with a vertical pipe having an open end at a level just below the intended level of the suspension when the tank is full. The lower end of the pipe passes out of the bottom of the tank and is connected to a pump the outlet of which is connected back into the bottom of the tank. The pump can be driven by an electric motor which will be switched on a few minutes before starting sowing so that the seed suspension will be adequately stirred and mixed.

By suspending the outlet end of the pipe above the ground behind the coulter the possibility of forming mud by mixing the gel with the soil is avoided, as such mud causes erratic seed delivery.

The drag bar 35 is pivotally mounted so as to be capable of falling to a position slightly below the level of the bottom of the coulter but is limited by a stop (e.g. the coulter 32) from falling below that position.

I claim:

1. Apparatus for sowing seed comprising a frame, means on said frame for rotatably supporting at least one ground engaging wheel, a tank mounted on the frame to contain seeds in suspension, a drill coulter mounted on the frame.

a peristaltic pump comprising a pipe at least part of which is resilient, pipe compressing rollers on one side of the pipe, and a pipe support bracket secured to the frame on the other side of the pipe;

the inlet of the pipe being connected to the tank outlet;

said pipe compressing rollers being rotatably mounted on said ground engaging wheel on axes parallel to the axis of the ground engaging wheel;

support means for the outlet end of said pipe whereby the open end of the pipe is held above normal ground level;

said means for rotatably supporting the ground wheel comprising an adjustable ring member on the frame, and a bearing member for the wheel eccentrically mounted in said ring member;

whereby the suspension is metered at a rate proportional to the distance travelled over the ground and the positions of the rollers relative to the pipe effected by adjustment of said ring member, the suspension falling from above ground level into the drill.

2. Apparatus as claimed in claim 1 provided with a single wheel and wherein the frame further includes a rearwardly extending part carrying the coulter and the support means for supporting the discharge end of the pipe, and an upstanding part to which the tank is fixed forwardly thereof, handle means fixed to the frame, said pipe extending from the bottom of the tank between the rollers and support bracket, over the rearwardly extending part and down to said support means and additional pipe support means between the tank and the rollers.

* * * * *